United States Patent [19]

Lemanski

[11] 3,714,358
[45] Jan. 30, 1973

[54] THIADIAZOLE HYDRAZONES AS FUNGICIDES

[75] Inventor: Chester G. Lemanski, East Brunswick, N.J.

[73] Assignee: Mobil Oil Corporation

[22] Filed: June 22, 1970

[21] Appl. No.: 48,492

[52] U.S. Cl. ................................424/270
[51] Int. Cl. .....................A01n 9/12, A01n 9/22
[58] Field of Search........................424/270

[56] References Cited

OTHER PUBLICATIONS

Sandstrom, J., "Cyclizations of Thiocarbohydrazide and its Mono-Hydrazones," Acta Chem. Scand., Vol. 15 (1961), No. 6, p. 1295–1302

Primary Examiner—Stanley J. Friedman
Assistant Examiner—Vincent D. Turner
Attorney—Oswald G. Hayes, Andrew L. Gaboriault and Mitchell G. Condos

[57] ABSTRACT

Certain 1,3,4-thiadiazol-2-yl hydrazones form a new class of fungicides. They are highly effective as spore fungicides against Monolinia fructicola and Stemphylium sarcinaeforme. They also are highly effective as soil fungicides against Fusarium oxysporium, Pythium debaryanum, Rhizoctonia solani, and Sclerotium rolfsii.

9 Claims, No Drawings

THIADIAZOLE HYDRAZONES AS FUNGICIDES

BACKGROUND OF THE INVENTION

1. Field of the Invention

This invention is directed to the novel use of certain 1,3,4-thiadiazol-2-yl hydrazones as fungicides. It is more particularly concerned with the use of 5-substituted 1,3,4-thiadiazol-2-yl hydrazones as fungicides.

2. Description of the Prior Art

Acetone [5-mercapto-1,3,4-thiadiazol-2-yl] hydrazone, a compound useful for practice of the present invention, is known to the art (*Acta. Chem. Scan.*, 15, 1295 [1961]).

SUMMARY OF THE INVENTION

This invention provides a method for combatting fungi which comprises contacting the fungi with a fungicidally effective amount of at least one compound having the formula:

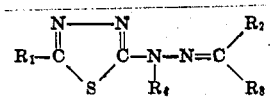

wherein $R_1$ is alkyl (e.g., $C_1$-$C_4$ or more), alkylthio (e.g., $C_1$-$C_4$ or more), mercapto, hydroxy, alkoxy (e.g., $C_1$-$C_4$), substituted phenyl, substituted phenoxy, substituted phenylthio, haloalkyl (e.g., $C_1$-$C_4$), lower alkyl (e.g., $C_1$-$C_6$) carbamoylthio, or lower alkyl (e.g., $C_1$-$C_6$) carbamoyloxy, $R_2$ and $R_3$ form a carbocyclic ring (e.g., $C_3$-$C_6$) or heterocyclic ring (e.g., $C_4$-$C_6$), or are hydrogen, alkyl (e.g., $C_1$-$C_8$ or more), haloalkyl (e.g., $C_1$-$C_3$), substituted phenyl, alkoxy (e.g., $C_1$-$C_3$), alkylthio (e.g., $C_1$-$C_3$) or combinations thereof, and $R_4$ is hydrogen, alkyl (e.g., $C_1$-$C_3$), trichloromethylthio, or alkoxy; and fungicidal compositions comprising at least one such compound and a carrier therefor.

DESCRIPTION OF SPECIFIC EMBODIMENTS

As will be noted from the above formula, the compounds for use as both contact and soil fungicides in the present invention are 5-substituted 1,3,4-thiadiazol-2-yl hydrazones. Non-limiting examples of the compounds disclosed for use as fungicides in this invention include:

acetone [5-mercapto-1,3,4-thiadiazol-2-yl] hydrazone;
2-butanone [5-mercapto-1,3,4-thiadiazol-2-yl] hydrazone;
2-hexanone [5-mercapto-1,3,4-thiadiazol-2-yl] hydrazone;
2-octanone [5-mercapto-1,3,4-thiadiazol-2-yl] hydrazone;
α,α,α-trifuluoracetone [5-mercapto-1,3,4-thiadiazol-2-yl] hydrazone;
acetaldehyde [5-mercapto-1,3,4-thiadiazol-2-yl] hydrazone;
salicylaldehyde [5-mercapto-1,3,4-thiadiazol-2-yl] hydrazone;
benzaldehyde [5-mercapto-1,3,4-thiadiazol-2-yl] hydrazone;
trichloroacetaldehyde [5-mercapto-1,3,4-thiadiazol-2-yl] hydrazone;
hexafluoroacetone [5-mercapto-1,3,4-thiadiazol-2-yl] hydrazone;
acetone [5-methyl-1,3,4-thiadiazol-2-yl] hydrazone;
2-hexanone [5-methyl-1,3,4-thiadiazol-2-yl] hydrazone;
benzaldehyde [5-methyl-1,3,4-thiadiazol-2-yl] hydrazone;
acetone [5-methylthio-1,3,4-thiadiazol-2-yl] hydrazone;
2-butanone [5-methylthio-1,3,4-thiadiazol-2-yl] hydrazone;
benzaldehyde [5-methylthio-1,3,4-thiadiazol-2-yl] hydrazone;
acetone [5-hydroxy-1,3,4-thiadiazol-2-yl] hydrazone;
benzaldehyde [5-hydroxy-1,3,4-thiadiazol-2-yl] hydrazone;
acetone [5-ethoxy-1,3,4-thiadiazol-2-yl] hydrazone;
2-butanone [5-methylphenyl-1,3,4-thiadiazol-2-yl] hydrazone;
acetone [5-phenoxy-1,3,4-thiadiazol-2-yl] hydrazone;
acetone [5-chloromethyl-1,3,4-thiadiazol-2-yl] hydrazone; and
acetone [5-(N-methylcarbamoylthio)-1,3,4-thiadiazol-2-yl] hydrazone.

The compounds of this invention are readily prepared by the general procedure:

An appropriate thiocarbohydrazone is reacted with carbon disulfide in the presence of a suitable reaction medium, e.g., pyridine. The precipitate formed is removed and the filtrate is evaporated to about half the original volume and added to water to give a crystalline product which may be further recrystallized from a suitable recrystallization medium, an example of which is ethanol.

The following examples demonstrate the typical procedure.

EXAMPLE 1

Acetone [5-mercapto-1,3,4-thiadiazol-2-yl] hydrazone

Monoacetone thiocarbohydrazone (4.5 g., 0.031 mole) and carbon disulfide (3.5 g., 0.047 mole) were refluxed in pyridine (40 ml) for 6 hours. A pale yellow precipitate (1 g.) was removed and identified as the bis-pyridinium salt of 4-amino-3,5-dimercapto-1,2,4-triazole by its melting point and infrared spectrum. The filtrate was then evaporated to nearly one half of the original volume, and the residue was poured onto water (50 ml). A crystalline product (1.9 g.) was obtained. It was recrystallized from ethanol as colorless rods with a melting point of 216°–217°C. The obtained product provided the following values upon analysis by the following identification methods:

Elemental Analysis

| | %C | %H | %N |
|---|---|---|---|
| Calculated ($C_5H_8N_4S_2$) | 31.90 | 4.28 | 29.76 |
| Found for Example Compound | 31.90 | 4.22 | 29.71 |

Mass Spectroscopy of Example Compound

M.W. 188, (P + 2 for 2 sulfurations)

NMR of Example Compound

δ:1.24 (6H; singlet), 11.4 (1H, singlet)

EXAMPLE 2

2-Butanone [5-mercapto-1,3,4-thiadiazol-2-yl] hydrazone

Mono 2-butanone thiocarbohydrazone (10 g., .063 mole) and carbon disulfide (7.2 g., 0.095 mole) were refluxed in pyridine (40 ml) for 6 hours. A pale yellow precipitate (1.5 g.) was removed and identified as the bis-pyridinium salt of 4-amino-3,5-dimercapto-1,2,4-triazole by its melting point and infrared spectrum. The filtrate was then evaporated to nearly one half of the original volume, and the residue was poured onto water (50 ml). A crystalline product (8.6 g.) was obtained. It was recrystallized from ethanol as colorless rods with a decomposition point of 215°–217°C. The obtained product provided the following values upon analysis by the following identification method:

NMR of Example Compound $\delta$:0.54 (3H; triplet), 1.24 (3H; singlet), 1.70 (2H, quartet), 10.1 (1H; singlet).

EXAMPLE 3

2-Hexanone [5-mercapto-1,3,4-thiadiazol-2-yl] hydrazone

Mono-2-hexanone thiocarbohydrazone (8.0 g., 0.043 mole) and carbon disulfide (5.0 g., 0.065 mole) were refluxed in pyridine (40 ml) for 6 hours. A pale yellow precipitate (1.8 g.) was removed and identified as the bis-pyridinium salt of 4-amino-3,5-dimercapto-1,2,4-triazole by its melting point and infrared spectrum. The filtrate was then evaporated to nearly one half of the original volume, and the residue was poured onto water (50 ml). A crystalline product (6.1 g.) was obtained. It was recrystallized from ethanol as colorless rods with a decomposition point of 208°–210°C. The obtained product provided the following values upon analysis by the following identification method:

NMR of Example Compound $\delta$:0.24 (3H; triplet), 0.70 (5H; complex multiplet), 1.20 (3H; singlet), 1.54 (2H; triplet), 11.16 (1H singlet).

EXAMPLE 4

$\alpha,\alpha,\alpha$-Trifluoroacetone[5-mercapto-1,3,4-thiadiazol-2-yl] hydrazone Mono$\alpha,\alpha,\alpha$-trifuloroacetone thiocarbohydrazone (10.0g., 0.05 mole) and carbon disulfide (5.3 g., 0.07 mole) were refluxed in pyridine (40 ml) for 6 hours. A pale yellow precipitate (0.6 g.) was removed and identified as the bis-pyridinium salt of 4-amino-3,5-dimercapto-1,2,4-triazole by its melting point and infrared spectrum. The filtrate was then evaporated to nearly one half of the original volume, and the residue was poured onto water (50 ml.). A crystalline product (2.1 g.) was obtained. It was recrystallized from ethanol as colorless rods with a decomposition point of 229°–231°C. The obtained product provided the following values upon analysis by the following identification method:

IR of Example Compound

N—H stretch = 3100 cm$^{-1}$; S-H stretch = 2600 cm$^{-1}$;
N—H bend = 1660 cm$^{-1}$; c=n stretch = 1610 cm$^{-1}$;
CF$_3$ bands = 1120 and 720 cm$^{-1}$.

EXAMPLE 5

Salicylaldehyde [5-mercapto-1,3,4-thiadiazol-2-yl] hydrazone

Mono salicylaldehyde thiocarbohydrazone (7.0 g., 0.033 mole) and carbon disulfide (3.5 g., 0.046 mole) were refluxed in pyridine (40 ml) for 6 hours. A pale yellow precipitate (2.4 g.) was removed and identified as the bis-pyridinium salt of 4-amino-3,5-dimercapto-1,2,4-triazole by its melting point and infrared spectrum. The filtrate was then evaporated to nearly one half of the original volume, and the residue was poured onto water (50 ml). A crystalline product (3.7 g.) was obtained. It was recrystallized from ethanol as light green rods with a decomposition point of 194°–197°C. The obtained product provided the following values upon analysis by the following identification method:

NMR of Example Compound $\delta$: 4.17 (1H; singlet), 7.32 (4H; complex multiplet), 8.94 (1H; singlet), 9.2 (1H, singlet), 13.5 (1H; singlet).

EXAMPLE 6

2-Octanone[5-mercapto-1,3,4-thiadiazol-2-yl] hydrazone

Mono 2-octanone thiocarbohydrazone (10.8 g., 0.05 mole) and carbon disulfide (5.8 g., 0.075 mole) were refluxed in pyridine (40 ml) for 6 hours. A pale yellow precipitate (0.5 g.) was removed and identified as the bis-pyridinium salt of 4-amino-3,5-dimercapto-1,2,4-triazole by its melting point and infrared spectrum. The filtrate was then evaporated to nearly one half of the original volume, and the residue was poured onto water (50 ml). A crystalline product (2.8 g.) was obtained. It was recrystallized from ethanol as colorless rods with a decomposition point of 140°–145°C. The obtained product provided the following values upon analysis by the following identification method:

NMR of Example Compound $\alpha$: 0.24 (3H; triplet), 0.70 (9H; complex multiplet), 1.20 (3H; singlet), 1.54 (2H; triplet), 11.16 (1H; singlet).

EXAMPLE 7

Acetone[5-(N-methylcarbamoylthio)-1,3,4-thiadiazol-2-yl] hydrazone

Acetone[5-mercapto-1,3,4-thiadiazol-2-yl) hydrazone (3.4 g., 0.018 mol), the compound of example 1, was dissolved in pyridine (40 ml) and methyl isocyanate (1.1 g., 0.02 mole) was added to the resulting solution in a pressure bottle. The solution was heated on a steam bath for 6 hours. The pyridine solution was then evaporated to dryness to yield the product of this example (1.1 g.), which had a decomposition point of 194°–196°C. Identification of this compound by infrared spectrum showed strong carbonyl absorption at 1725 cm$^{-1}$.

The compounds of the examples were subjected to the following fungicidal tests. The results are set forth in the Table following the test descriptions.

FUNGICIDE TESTING METHODS

Spore Germination Test

Fungus species *Monolinia fructicola* and *Stemphylium sarcinaeforme* are cultured on potato dextrose agar and oat agar, respectively, at room temperature under continuous fluorescent light. Spores growing in 90 mm. petri dishes containing 40 ml. of the respective agar medium are ready for testing after one week.

Spores are obtained by scraping them from the surface of the cultures with a rubber policeman or bacterial loop and washing them free with distilled water. The spores in suspension are filtered through a thin layer of glass wool to remove bits of mycelium, and freed of soluble extraneous materials be centrifuging and resuspending in distilled water. The spore concentration is adjusted to 10,000 per ml. using a Fuchs-Rosenthal counting chamber.

One hundred mg. of each test compound is weighted into a 4-dram wide-mouth vial and dissolved in 10 ml. of a volatile solvent (usually acetone) giving a 10,000 ppm concentration. A 50 ppm concentration is prepared by serial dilution.

Two-tenths ml. of the 50 ppm solution is placed in the well of a hollow-ground depression slide. One slide is prepared for each fungus organism. The volatile solvent is allowed to evaporate (15 minutes for acetone) leaving a deposit of the toxicant. Two-tenths ml. of the spore suspension with a stimulant solution is then added to each slide.

Slides are then placed in large, inverted glass moisture chambers on metal holding racks and the chambers are sealed with water to maintain a high relative humidity of near 100 percent. Chambers are held at constant room temperature near 24°C.

After sixteen hours, results are taken by counting the number of spores germinating per 50 spores from each of the two slides treated with the compound. The number failing to germinate is recorded as percent spore germination inhibition.

Soil Test

Four representative soil fungi, *Fusarium oxysporium*, *Pythium debaryanum*, *Rhizoctonia solani* and *Sclerotium rolfsii*, are maintained on potato dextrose agar in 20 × 150 mm. test tubes. Inoculum for the test is increased in a 1000 ml. Erlenmeyer flask on a ¼ corn meal-¾ sand mixture (by volume). The medium is saturated with water and sterilized by autoclaving at 15 lbs. pressure for 20 minutes on two successive days. The medium is inoculated by transferring, aseptically, a small portion of mycelium from the test tube cultures 14 days prior to using for inoculum.

An inoculated medium for each of the four soil organisms is prepared as follows: A 14 day old 1000 ml. flask of the corn meal-sand inoculum is used to inoculate 20 10 oz. cups of sterile soil by blending the inoculum and sterile soil for 10 minutes in the cement mixer.

The inoculated medium is then placed in 10 oz. wax treated cold drink cups (20 cups of each organism) and treated as follows: 150 mg. quantity of each candidate fungicide is weighed on the analytical balance and formulated using 10 ml. of acetone and 190 ml. of $H_2O$. If the compound is insoluble in acetone or water, 1.1 g. of Continental Clay, 0.1 g. of Marasperse N and 2 g. of Petro-BP is added and the mixture ground in the Waring blender for 3 minutes. Continental Clay is kaolinite clay, Marasperse N is sodium ligno sulfonate and Petro-BP is linear alkylnaphthalene sodium sulfonate. A 50 ml. quantity of each chemical formulation is used to drench 1 cup inoculated with each of the four fungal organisms. Immediately after the cups are drenched, they are placed in polyethylene bags (1 cup per bag) and held at 70°F. for fourteen days.

After ten days, each cup is examined for the presence of fungal growth and each compound rated for percent inhibition of fungal growth.

TABLE.—FUNGICIDAL ACTIVITY[1] OF THIADIAZOLE HYDRAZONES

| Compound of Example | Concentration of compound | Monolinia fructicola | Stemphylium sarcinaeforme | Fusarium oxysporium | Pythium debaryanum | Rhizoctonia solani | Sclerotium rolfsii |
|---|---|---|---|---|---|---|---|
| 1 | 50 p.p.m. / 25 lbs./acre | 100 | 70 | 90 | 0 | 30 | 30 |
| 2 | 50 p.p.m. | 80 | 80 | | | | |
| 3 | 50 p.p.m. | 90 | 80 | | | | |
| 4 | 50 p.p.m. / 25 lbs./acre | 100 | 30 | 40 | 50 | 0 | 0 |
| 5 | 50 p.p.m. / 25 lbs./acre | 100 | 30 | 80 | 0 | 90 | 90 |
| 6 | 50 p.p.m. | 100 | 0 | | | | |
| 7 | 50 p.p.m. | 100 | 80 | | | | |

[1] Fungicidal activity is measured in percent effectiveness.

From the data in the Table, it will be noted that the thiadiazole hydrazones used in this invention have a broad range of fungicidal activity. The compounds of examples 1, 2, 3 and 7 are 70 to 100 percent effective as spore germination inhibitors against both Monolinia fructicola and Stemphylium sarcinaeforme at only 50 ppm fungicidal concentration. The compounds of examples 4, 5 and 6 are 100 percent effective against Monolinia fructicola and that of example 5 shows excellent effectiveness against soil fungal growth at 25 lbs/acre.

The compounds may be used in this invention in various ways to achieve fungicidal action. They can be applied as dusts, as liquid sprays, or as gas-propelled sprays, and can contain, in addition to a carrier, additives such as emulsifying agents, wetting agents, binding agents, gases compressed to the liquid state, odorants, stabilizers and the like. A wide variety of liquid and solid carriers can be used in the fungicidal compositions. Non-limiting examples of liquid carriers include water; organic solvents, such as alcohols, ketones, amides, and esters; mineral oils, such as kerosene, light oils, and medium oils; and vegetable oils, such as cottonseed oil. Non-limiting examples of solid carriers include talc, bentonite, diatomaceous earth, pyrophyllite, fullers earth, gypsum, flours derived from cotton seeds and nut shells, and various natural and synthetic clays having a pH not exceeding about 9.5.

In order to achieve a broader spectrum of control, it is within the contemplation of this invention to include two or more thiadiazole hydrazone derivatives in the fungicidal composition. The amount of the derivatives used in the fungicidal compositions will vary rather widely. It depends to some extent upon the type of composition in which the material is being used, the nature of the condition to be controlled, and the method of application. In the ultimate fungicidal composition, as applied in the field, fungicide concentration as low as 0.001 weight percent of the total composition can be used. In general, compositions, as applied, containing about 0.0005 weight percent fungicide in either liquid or solid carrier, give good results. In some cases, however, stronger dosages up to about one weight percent may be required.

In practice, fungicidal compositions are usually prepared in the form of concentrates, which are diluted in the field to the concentration desired for application. For example, the concentrate can be a wettable powder containing large amounts of fungicide, a carrier (e.g., attapulgite or other clay), and wetting and dispersing agents. Such powders can be diluted prior to application by dispersing them in water to obtain a sprayable suspension containing the concentration of fungicide desired for application. Other concentrates can be solutions that can be later diluted, e.g., with kerosene. Thus, it is within the contemplation of this invention to provide fungicidal compositions containing up to about 80 percent, by weight of the composition, of fungicide. Accordingly, depending upon whether it is ready for application or it is in concentrated form, the contemplated fungicidal compositions contain between about 0.0001 percent and 80 percent, by weight of the composition of at least one fungicidal thiadiazole hydrazone derivative and a carrier, liquid or solid, as defined hereinbefore.

Although the present invention has been described with preferred embodiments, it is to be understood that modifications and variations may be resorted to, without departing from the spirit and scope of this invention, as those skilled in the art will readily understand.

What is claimed is:

1. A method for combatting soil fungi which comprises applying to said soil fungi a fungicidally effective amount of a compound having the formula:

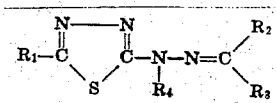

wherein $R_1$ is alkyl of from 1 to 4 carbon atoms, alkylthio of from 1 to 4 carbon atoms, mercapto, hydroxy, alkoxy of from 1 to 4 carbon atoms, methylphenyl, phenoxy, haloalkyl of from 1 to 4 carbon atoms, or alkyl carbamoylthio of from 1 to 6 carbon atoms, $R_2$ and $R_3$ are hydrogen, alkyl of from 1 to 8 carbon atoms, haloalkyl of from 1 to 3 carbon atoms, or hydroxy phenyl and $R_4$ is hydrogen.

2. A method for combatting fungi, as defined in claim 1, wherein $R_1$ is mercapto or lower alkyl ($C_1$-$C_6$) carbamoylthio, $R_2$ is $C_1$-$C_4$ alkyl, $C_1$-$C_3$ haloalkyl, or hydrogen, $R_3$ is $C_1$-$C_6$ alkyl or hydroxy phenyl, and $R_4$ is hydrogen.

3. A method for combatting fungi, as defined in claim 1, wherein the fungicidally effective compound has the formula:

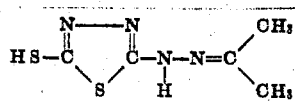

4. A method for combatting fungi, as defined in claim 1, wherein the fungicidally effective compound has the formula:

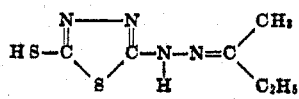

5. A method for combatting fungi, as defined in claim 1, wherein the fungicidally effective compound has the formula:

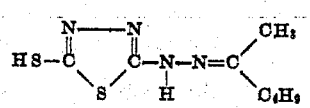

6. A method for combatting fungi, as defined in claim 1, wherein the fungicidally effective compound has the formula:

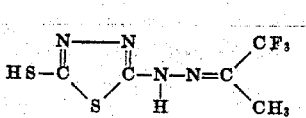

7. A method for combatting fungi, as defined in claim 1, wherein the fungicidally effective compound has the formula:

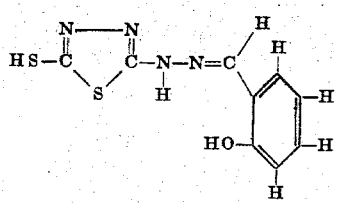

8. A method for combatting fungi, as defined in claim 1, wherein the fungicidally effective compound has the formula:

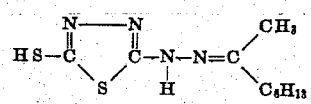

9. A method for combatting fungi, as defined in claim 1, wherein the fungicidally effective compound has the formula:

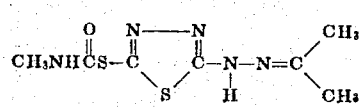

* * * * *